United States Patent
Gerlach et al.

(10) Patent No.: US 6,219,094 B1
(45) Date of Patent: Apr. 17, 2001

(54) NON-LINEAR FILTER FOR EXTRACTING LUMINANCE COMPONENT FROM A COMPOSITE VIDEO SIGNAL

(75) Inventors: Paul M. Gerlach; James L. Tallman, both of Beaverton, OR (US)

(73) Assignee: Tektronix, Inc., Beaverton, OR (US)

(*) Notice: Subject to any disclaimer, the term of this patent is extended or adjusted under 35 U.S.C. 154(b) by 0 days.

(21) Appl. No.: 09/293,048

(22) Filed: Apr. 16, 1999

(51) Int. Cl.[7] .................................................. H04N 17/00
(52) U.S. Cl. ................................................ 348/184; 348/180
(58) Field of Search .................................... 348/184, 180, 348/185, 186, 663, 325, 739; 324/121 R

(56) References Cited

U.S. PATENT DOCUMENTS

| | | | |
|---|---|---|---|
| 4,635,094 | * 1/1987 | Thong | 358/10 |
| 4,698,664 | * 10/1987 | Nichols et al. | 358/10 |
| 4,707,727 | * 11/1987 | Penney | 358/10 |
| 4,816,897 | * 3/1989 | Konishi | 358/10 |
| 5,734,422 | * 3/1998 | Maurer et al. | 348/184 |

* cited by examiner

Primary Examiner—Victor R. Kostak
(74) Attorney, Agent, or Firm—David N. Caracappa

(57) ABSTRACT

A luminance component extractor coupled to a source of a composite video signal including a luminance component. A sampler, coupled to the video signal source, produces samples representing a frame the video signal. A memory maintains minimum and maximum values of each sample in the frame of the video signal. A non-linear low pass filter, responsive to the minimum and maximum values, generates samples representing the luminance component.

8 Claims, 2 Drawing Sheets

NON-LINEAR FILTER FOR EXTRACTING LUMINANCE COMPONENT FROM A COMPOSITE VIDEO SIGNAL

FIELD OF THE INVENTION

The present invention relates to digital storage oscilloscopes in general, and to the processing of video signals in such a digital oscilloscope, in particular.

BACKGROUND OF THE INVENTION

Video waveform monitors, for example the Tektronix 1740 and 1750 series and the digital video waveform monitor VM700, are known. Such monitors are specialized and relatively expensive test equipment meant for analyzing video signals. These monitors have the capability to display video waveforms and vector diagrams. In addition, they have the capability to display images represented by video signals, thus allowing the them to act as video monitors. This may be done, for example, by sampling the received video signal, then generating from the video samples an array of display pixels representing the image carried by the video signal. This array of display pixels is displayed on a display device associated with the video waveform monitor. However, such a capability requires a high sampling rate and large acquisition memory to store the video samples representing a frame of the image (sometimes termed record length). These requirements were met only in the relatively expensive, high-end, specialized video waveform monitors. It is desirable, however, to provide the video image display capability in general purpose digital storage oscilloscopes.

One problem in producing an image representing a video signal is to extract the gray scale (luminance) and color (chrominance) components from the composite video signal. For low-end systems, gray scale images only are displayed. This requires that a minimum of the luminance component be extracted from the composite video signal.

One known method for extracting the luminance and chrominance components is to oversample the video signal sufficiently that digital filters may filter out the luminance and chrominance components. These filters may be implemented on a digital signal processor (DSP) integrated circuit chip. They may be arranged as a low pass filter and a bandpass filter in parallel processing the composite video signal: the low pass filter extracting the luminance component and the bandpass filter extracting the chrominance component. Alternatively, the filters may be implemented as a comb filter processing the composite video signal which simultaneously extracts the luminance and chrominance components. In either arrangement, this method requires a high sample rate, and consequently has a large record length requiring a large memory to store a video frame of samples.

Another method is to use a hardware probe module containing a discrete analog low pass filter which extracts the luminance component. This method does not affect the sample rate of the oscilloscope, but requires a separate hardware assembly, which must be removed from the oscilloscope probe should a user wish to observe the color content of the video signal.

Another method is to use a high sampling rate and generate small display pixels corresponding to the video samples without any processing to display the received video. Because of the phasing of the color subcarrier, the human eye will see a dithered pattern of light and dark pixels and will tend to average the brightness of those pixels to the underlying luminance level underlying the chrominance component. It is also possible to perform minimal processing of the display pixels, for example by averaging two adjacent pixels, to improve the displayed image. Because of the high sampling rate, this method may also require a large record length and consequent large memory.

BRIEF SUMMARY OF THE INVENTION

In accordance with principles of the present invention a luminance component extractor is coupled to a source of a composite video signal including a luminance component. A sampler, coupled to the video signal source, produces samples representing a frame of the video signal. A memory maintains minimum and maximum values of each sample in the frame of the video signal. A non-linear low pass filter, responsive to the minimum and maximum values, generates samples representing the luminance component.

DETAILED DESCRIPTION OF THE INVENTION

Figure 1:
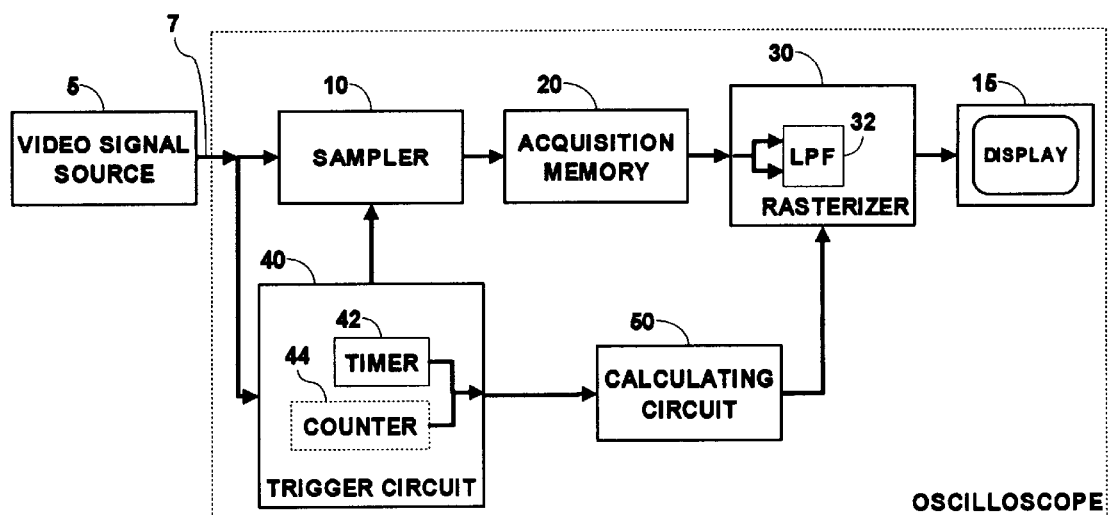
FIG. 1 is a block diagram of an oscilloscope system according to the present invention.

FIG. 1 is a block diagram of an oscilloscope system according to the present invention. FIG. 1 shows only those elements of an oscilloscope which are necessary to understand the operation of the invention. One skilled in the art will understand what other elements are present in an oscilloscope and how the illustrated elements are interconnected with those elements.

In FIG. 1, an output terminal of a source 5 of a video signal is coupled through an oscilloscope probe 7 to a data input terminal of a sampler 10. For example, the video signal source 5 may be a video camera, or video signal generator. An output terminal of the sampler 10 is coupled to an input terminal of an acquisition memory 20. An output terminal of the acquisition memory 20 is coupled to a data input terminal of a rasterizer 30. An output terminal of the rasterizer 30 is coupled to an input terminal of a display device 15. The oscilloscope probe 7 is also coupled to an input terminal of a trigger circuit 40. A first output terminal of the trigger circuit 40 is coupled to an input terminal of a calculating circuit 50 and a second output terminal of the trigger circuit 40 is coupled to a control input terminal of the sampler 10. An output terminal of the calculating circuit 50 is coupled to a control input terminal of the rasterizer 30. The combination of the sampler 10, the acquisition memory 20, the rasterizer 30, the display device 15, the trigger circuit 40 and the calculating circuit 50 are comprised in an oscilloscope.

Figure 2:
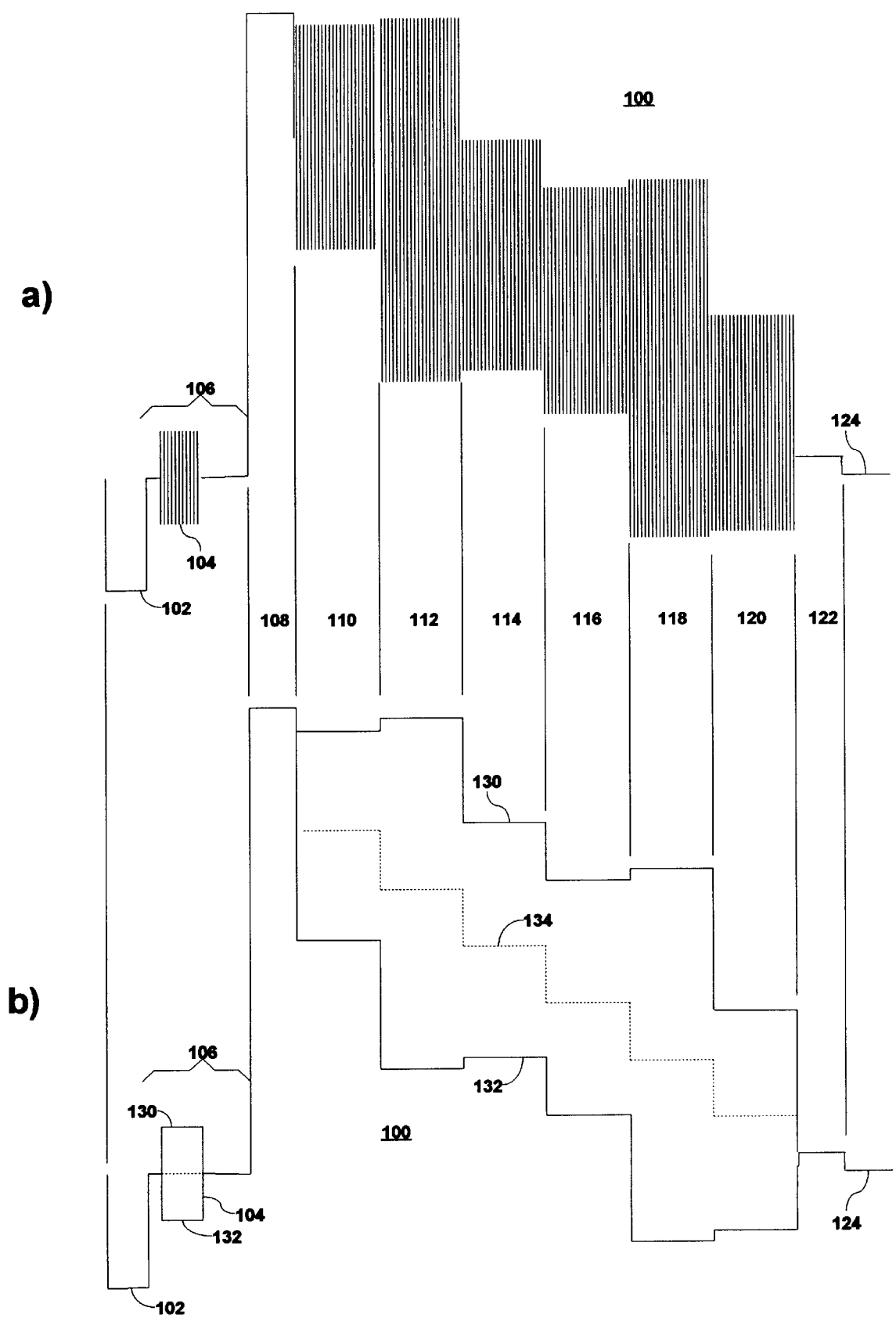
FIG. 2 is a waveform diagram useful in understanding the operation of the oscilloscope system illustrated in FIG. 1.

The video signal from the video signal source 5 is a composite video signal containing a luminance component representing the gray scale information of the image, a chrominance component representing the color information of the image, and a synchronizing component containing information identifying the location of the top of the raster (vertical synchronization) and the beginning of each horizontal line in the raster (horizontal synchronization). FIG. 2 is a waveform diagram useful in understanding the operation of the oscilloscope system illustrated in FIG. 1. FIG. 2 illustrates one horizontal line 100 of an NTSC video signal in which the image represented by the video signal is the well known image of color bars. FIG. 2a is a waveform diagram of a composite video signal as received from the video signal generator 5 (of FIG. 1) at the oscilloscope probe 7. In FIG. 2a, a horizontal synchronization pulse 102 is followed by a color burst 104 on a back porch 106. Following the back porch 106 are a series of color bars 108 to 122, representing white (108), yellow (110), cyan (112), green (114), magenta (116), red (118), blue (120), and black (122) respectively. All except the white (108) and black (122) color bars, include a color subcarrier signal (represented by vertical hatching) having a phase and amplitude corresponding to the color of that bar superimposed on a luminance value also corresponding to that color, all in a known manner. The color bars are followed by a front porch 124, which is followed by the horizontal synchronization signal for the following line (not shown).

Present oscilloscopes include circuitry which permits acquisition of samples representing the peak values of a received signal during the sample period. When this circuitry is operating, the oscilloscope is termed to be operating in 'peak detect' mode. In the 'peak detect' mode, for each sample time, a minimum and a maximum value of the observed signal over that sample period, are detected. That is, two multibit samples are produced for each sample period, all in a known manner. In the illustrated embodiment, the oscilloscope is configured to operate in the 'peak detect' mode.

Referring again to FIG. 1, in operation, when a signal acquisition is triggered (to be described in more detail below), the sampler 10 samples the video signal 100 at a predetermined sampling rate. In the illustrated embodiment, the sampler 10 produces samples representing the video signal every 800 nanoseconds (nsec), although other sampling rates may be used and/or may be selectable by a user of the oscilloscope, subject to a constraint described in detail below. In the illustrated embodiment, the samples are multibit digital samples having values representing the value of the video signal at the time represented by that sample. In the illustrated embodiment, these multibit digital samples have nine bits each. Samples containing any number of bits may be used, although samples having at least eight bits are preferred.

For an NTSC video signal, the color subcarrier frequency is substantially 3.58 MHz, having a period of substantially 280 nsec. In an 800 nsec sample period, there are nearly three complete cycles of the color subcarrier. Thus, when such a signal is processed by an oscilloscope operating in the 'peak detect' mode, the maximum value for that sample time represents the maximum value of those cycles of the color subcarrier, and the minimum value for that sample time represents the minimum value of those cycles of the color subcarrier. In order to properly acquire the maximum and minimum excursions of the color subcarrier, the sampling period used must be greater than the period of the color subcarrier of the video signal being acquired (e.g. greater than substantially 280 nsec for an NTSC video signal).

The combination of the maximum values of all the sample periods form an upper perimeter of an envelope of the video signal and the minimum values of all the sample periods form a lower perimeter of the envelope. The 'peak detect' sampled video signal of FIG. 2a is illustrated in FIG. 2b. In locations where the chrominance component is present, as indicated by the presence of a color subcarrier signal (e.g. color burst 104, and color bars 110–120), samples representing the upper perimeter 130 have distinct values compared to the samples representing the lower perimeter 132. At all other locations, samples representing the upper and lower perimeters have the same values.

In a composite video signal not every horizontal line interval contains image data. Some horizontal lines are within the vertical synchronization interval and some are within overscan interval and may contain other information than image information. In an NTSC video signal, image data begins on line 21 in field one of each frame. The trigger circuit 40 monitors the video signal, and when line 21 in field one of the frame is detected, it generates a control signal for the sampler 10 causing it to begin generating samples representing the video signal. Each set of samples stored in the acquisition memory 20 representing a horizontal line includes both the portion of the horizontal line containing image data, e.g. color bars 108–122 of FIG. 2; and the portion of the horizontal line containing non-image information, e.g. front porch 124, horizontal synchronization signal 102 and back porch 106.

Maximum and minimum value samples are generated in the sampler 10 and stored in the acquisition memory 20 in this manner until the last line containing image data in the raster has been sampled. When completed, the acquisition memory 20 contains minimum and maximum values representing the portion of the video signal containing image data for a frame of the image.

In general, the rasterizer 30 extracts samples from the acquisition memory 20 and produces a raster signal representing that data. That raster signal is then displayed on the display device 15. Under normal operation, the image displayed in this manner is a line, commonly called a trace, representing the waveform of the signal received at the oscilloscope probe 7. When the oscilloscope is operating in the normal peak detect mode, the displayed image is a white band indicating the envelope of the received signal.

In accordance with the present invention, however, the rasterizer 30 generates a raster of display pixels having intensity values which reproduce the image represented by the video signal on the display device 15. To generate this raster of pixels, the rasterizer 30 associates each pixel in the display raster with a video sample in the acquisition memory 20 at the same spatial location as the display pixel, or with some plurality of video samples in the spatial neighborhood of the location of the display pixel. Each display pixel is generated from values of the associated video sample, or samples. The rasterizer 30 may be implemented in hardware, or by a microprocessor executing a program for analyzing the video samples from the acquisition memory 20, as described below, to generate the raster of pixels.

In order to associate display pixels with video samples, the rasterizer 30 must determine the spatial location of each video sample in the acquisition memory 20. To do this, the rasterizer 30 must first determine the location of the horizontal synchronization signal for each horizontal line stored in the acquisition memory 20. From this information, the rasterizer 30 can determine both the horizontal line (vertical location), and the horizontal location within that line, i.e. the spatial location, of all stored samples. The combination of the trigger circuit 40 and calculating circuit 50 provides the locations of the horizontal synchronization signals to the rasterizer 30.

As described above, the trigger circuit 40 generates a control signal for the sampler 10 when the first line containing image data (i.e. line 21) is detected. This control signal conditions the sampler 10 to begin to sample the video signal. A timer 42 measures the time between each of those control signals. The resulting time is the actual frame time of the video signal. A trigger circuit 40, which can provide the control signal to the sampler 10, and a timer 42, which can measure the time between such control signals, may be implemented together on a single integrated circuit. For example, a model ADG365 trigger integrated circuit (manufactured by Tektronix, Inc.) provides both of these functions and can be used, in a known manner. While it is illustrated in FIG. 1 that the timer 42 is contained within the trigger circuit 40, this is merely to illustrate that in the illustrated embodiment the timer 42 is fabricated on the same integrated circuit as the trigger circuit 40. One skilled in the art will understand that the timer 42 may be fabricated separately and be responsive to the control signal generated by the trigger circuit 40.

The calculating circuit 50 calculates the information necessary to locate the horizontal synchronization signals for the horizontal lines stored in the acquisition memory 20. The number of horizontal lines in a video frame of a known video format is fixed and known. The time between successive horizontal synchronization signals, i.e. the horizontal line time, thus, may be calculated as the video frame time (from timer 42) divided by the total number of horizontal lines in a video frame. For example, in an NTSC video signal, there are 525 horizontal lines in a video frame. The horizontal line time, thus, is the video frame time divided by 525. In this manner, the average horizontal line duration for the frame is calculated and used to locate the starts of the horizontal lines in the video samples in the acquisition memory 20.

The calculating circuit 50 may be implemented in hardware as a divider circuit having a dividend input terminal coupled to receive the video frame time representative data, a divisor input terminal coupled to receive a signal representing the number of horizontal lines in a video frame, and a quotient output terminal, coupled to the rasterizer 30, for generating a signal representing the horizontal line time. Alternatively, the calculating circuit 50 may be implemented as a microprocessor executing a control program to divide the video frame time by the number of horizontal lines in a frame, in a known manner. This microprocessor may be dedicated to the calculating circuit 50 or may perform other functions in the oscilloscope.

A more general implementation may further utilize a counter 44, illustrated in phantom in FIG. 1, present in the ADG365 trigger integrated circuit (described above). The counter 44 may be configured in a known manner to detect and count the number of horizontal synchronization signals detected in a frame of the video signal. The number of horizontal synchronization signals in a video frame thus counted is also supplied to the calculating circuit 50. The calculating circuit 50 divides the video frame time from timer 42 by the number of horizontal pulses from counter 44 to generate the horizontal line time, as described above. This arrangement permits the oscilloscope to display images transmitted in any video format, such as NTSC, PAL, SECAM, etc. Similarly to the timer 42, while it is illustrated in FIG. 1 that the counter 44 is contained within the trigger circuit 40, this is merely to illustrate that in the illustrated embodiment the counter 44 is fabricated on the same integrated circuit as the trigger circuit 40. One skilled in the art will understand that the counter 44 may be fabricated separately and be responsive to signals from the trigger circuit 40.

The location in the acquisition memory 20 of the video sample corresponding to the first horizontal synchronization signal (i.e. in line 21) may be located by analyzing the values of the samples near the beginning of the video samples in the acquisition memory 20 to detect the first horizontal synchronization pulse, in a known manner. The location of the second horizontal synchronization signal is then determined by calculating the location of the sample one horizontal line time (as generated by the calculating circuit 50) after the location of the first horizontal synchronization pulse. The location of the third horizontal synchronization pulse is determined by calculating the location of the sample two horizontal line times after the location of the first horizontal synchronization pulse, and so forth. From the locations of the respective horizontal synchronization signals, the spatial locations of the video samples corresponding to display pixel locations in the displayed image can be determined, as described above. This method for determining the locations of the horizontal synchronization signals, e.g. using the average horizontal line duration over the frame, minimizes a one pixel horizontal dither from line to line. In addition, vertical edges are displayed as straight vertical lines in each frame to frame.

The value of each display raster pixel is calculated from the maximum and minimum values stored as described above in the acquisition memory 20 for the video sample associated with that display pixel. The display pixel value is set to a value half way between the maximum and minimum values. This operation is a non-linear low pass filtering operation, and is represented in FIG. 1 by low pass filter (LPF) 32 having a first input terminal coupled to receive the maximum value and a second input terminal coupled to receive the minimum value for the associated video sample from the acquisition memory 20.

LPF 32 may be implemented by a summer having a addend input terminal coupled to receive the maximum value sample, and an augend input terminal coupled to receive the minimum value sample. The sum output terminal is coupled to a divide-by-two circuit (which may be implemented by shifting the output from the adder to the right one bit, in a known manner). Alternatively, LPF 32 may be implemented in a microprocessor performing the sum and divide operations in response to a control program. As described above, the microprocessor may be dedicated to the LPF 32 or may perform other operations in the oscilloscope.

Referring again to FIG. 2b, the pixel values generated by the LPF 32 in the manner described above for areas in which the color subcarrier is present (104 and 110–120) are illustrated as a dashed line waveform 134. The pixel values 134 are located halfway between the maximum values 130 and minimum values 132. This is substantially at the value of the luminance component of the video signal 100.

A video monitor for an oscilloscope as described above may be implemented on a relatively low end oscilloscope without requiring substantial added circuitry, increasing the cost. It reproduces a gray scale image corresponding to the received video signal relatively accurately even if the timing of the video signal is not exactly according to the video standard, or varies over time.

What is claimed is:

1. A luminance component extractor comprising:
   an input for receiving a composite video signal including a luminance component;
   a sampler, coupled to the video signal source, for producing a maximum value sample and a minimum value in each of successive sample periods representing a frame of the video signal;
   a memory for storing the minimum and maximum value samples for each sample period in the frame of the video signal; and
   a non-linear low pass filter, coupled to the memory, and responsive to the stored minimum and maximum values, for generating samples representing the luminance component.

2. The extractor of claim 1 wherein the non-linear low pass filter comprises:
   an adder, having a first input terminal responsive to the minimum values, a second input terminal responsive to the maximum values, and an output terminal; and
   a divider, having an input terminal coupled to the output terminal of the adder, for dividing the signal at its input terminal by two.

3. The extractor of claim 2 wherein:
   the sampler produces multibit digital samples;
   the adder is a digital adder having a multibit output terminal; and
   the divider is formed by shifting the bits of the output terminal of the adder one bit to the right.

4. The extractor of claim 1 wherein the non-linear low pass filter comprises circuitry, responsive to each sample in a video frame, for producing a corresponding sample having a value between the maximum and minimum value and representing the luminance value for that sample.

5. The extractor of claim 4 wherein the sample producing circuitry comprises circuitry for producing the corresponding sample mid-way between the maximum and minimum value.

6. The extractor of claim 1 further comprising:
   a rasterizer, coupled to the non-linear low pass filter, for generating a raster of pixels having values corresponding to the luminance component representative samples; and
   a display device, coupled to the rasterizer, for displaying the image represented by the raster of pixels.

7. The extractor of claim 1 wherein the video signal source is a video camera.

8. A digital storage oscilloscope, comprising:
   a luminance component extractor, for receiving a composite video signal including a luminance component;
   said luminance extractor including a sampler, coupled to the video signal source, for producing a maximum value sample and a minimum value in each of successive sample periods representing a frame of the video signal;
   a memory for storing the minimum and maximum value samples for each sample period in the frame of the video signal; and
   a non-linear low pass filter, coupled to the memory, and responsive to the stored minimum and maximum values, for generating samples representing the luminance component;
   said digital storage oscilloscope further including a rasterizer, coupled to the non-linear low pass filter, for generating a raster of pixels having values corresponding to the luminance component representative samples; and
   a display device, coupled to the rasterizer, for displaying the image represented by the raster of pixels.

* * * * *